US012770785B2

(12) United States Patent
Yun et al.

(10) Patent No.: US 12,770,785 B2
(45) Date of Patent: Oct. 20, 2026

(54) MULTILAYER ELECTRONIC COMPONENT INCLUDING NI-PD BASE ELECTRODE LAYER

(71) Applicant: SAMSUNG ELECTRO-MECHANICS CO., LTD., Suwon-si (KR)

(72) Inventors: Hyung Duk Yun, Suwon-si (KR); Byung Jun Jeon, Suwon-si (KR); Chae Min Park, Suwon-si (KR); Yong Won Seo, Suwon-si (KR); Ho In Jun, Suwon-si (KR); A Ra Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 84 days.

(21) Appl. No.: 18/437,561

(22) Filed: Feb. 9, 2024

(65) Prior Publication Data

US 2024/0290540 A1 Aug. 29, 2024

(30) Foreign Application Priority Data

Feb. 28, 2023 (KR) ........................ 10-2023-0026870

(51) Int. Cl.

*H01G 4/008* (2006.01)
*H01G 4/232* (2006.01)
*H01G 4/30* (2006.01)

(52) U.S. Cl.

CPC ......... *H01G 4/0085* (2013.01); *H01G 4/2325* (2013.01); *H01G 4/30* (2013.01)

(58) Field of Classification Search

None

See application file for complete search history.

(56) References Cited

U.S. PATENT DOCUMENTS

2008/0210564 A1 9/2008 Motoki et al.
2010/0091426 A1 4/2010 Motoki et al.
2010/0328842 A1 12/2010 Takeuchi et al.
(Continued)

FOREIGN PATENT DOCUMENTS

JP H10-135065 A 5/1998
JP H11-54364 A 2/1999
(Continued)

OTHER PUBLICATIONS

Extended European Search Report dated Dec. 17, 2024 issued in corresponding to European Patent Application No. 24158075.2.

*Primary Examiner* — Eric W Thomas
(74) *Attorney, Agent, or Firm* — Morgan, Lewis & Bockius LLP

(57) ABSTRACT

Provided is a multilayer electronic component according to an example embodiment of the present disclosure including: a body including a dielectric layer and an internal electrode alternately disposed with the dielectric layer in a first direction, and including Ni; and an external electrode disposed on the body and connected to the internal electrode, wherein the external electrode includes a base electrode layer including Ni and Pd, and the internal electrode includes a first region, and a content of Pd included in the first region is greater than a content of Pd included in a remaining region, excluding the first region in the internal electrode.

23 Claims, 9 Drawing Sheets

I-I'

(56) References Cited

U.S. PATENT DOCUMENTS

| | | | | |
|---|---|---|---|---|
| 2014/0321025 | A1* | 10/2014 | Saito | H01G 4/232 205/181 |
| 2015/0085422 | A1* | 3/2015 | Kim | H01G 4/2325 156/89.18 |
| 2016/0225525 | A1 | 8/2016 | Mizuno et al. | |

FOREIGN PATENT DOCUMENTS

| | | | |
|---|---|---|---|
| JP | 2004-007015 | A | 1/2005 |
| JP | 5783242 | B2 | 7/2015 |
| JP | 6512844 | A | 5/2019 |
| KR | 10-2021-0126950 | A | 10/2021 |
| WO | 2008/059666 | A1 | 5/2008 |

* cited by examiner

MULTILAYER ELECTRONIC COMPONENT INCLUDING NI-PD BASE ELECTRODE LAYER

CROSS-REFERENCE TO RELATED APPLICATION (S)

This application claims the benefit of priority to Korean Patent Application No. 10-2023-0026870 filed on Feb. 28, 2023, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser mounted on the printed circuit boards of various electronic products such as image display devices including a liquid crystal display (LCD) and a plasma display panel (PDP), computers, smartphones, and mobile phones, and serves to charge or discharge electricity therein or therefrom.

Since the multilayer ceramic capacitor has the advantages of being compact, having high capacity and being easy to install, it may be used as a component of various electronic devices. As various electronic devices such as computers and mobile devices have been miniaturized and have become high-powered, there is increasing demand for miniaturization and the implementation of high capacitance in multilayer ceramic capacitors.

A conventional multilayer ceramic capacitor is formed by stacking a ceramic green sheet coated with a paste for an internal electrode and then sintering the ceramic green sheet to from a body, and applying and sintering a paste for an external electrode including Cu and glass on the body to form an external electrode. However, during the sintering process, due to the contraction of the internal electrode, the internal electrode may be formed to be recessed into the body to reduce a connection between the internal electrode and the external electrode, and accordingly, there has been a problem that the electrical characteristics of the multilayer ceramic capacitor may be deteriorated. Furthermore, since Cu of the external electrode diffuses into the internal electrode during the sintering process to cause volume expansion of the body and to increase the stress applied to the body, there has been a problem in that radial cracks may be generated in the body.

In order to improve the electrical characteristics of multilayer ceramic capacitors, a method of forming a plating layer instead of a sintered electrode with a base electrode layer directly connected to the internal electrode may be considered. However, when the base electrode layer is formed as the plating layer, an additional plating process needs be performed in addition to a Ni plating layer-Sn plating layer for mounting, and specifically, in order to form the base electrode layer by directly plating Ni on the body using an electroplating method, excessive plating time is required, which may cause excessive penetration of hydrogen ions into the body by a chemical reaction in a plating layer formation process. Such penetration of hydrogen ions may cause a problem of deteriorating insulation resistance while reducing the dielectric layer.

Accordingly, there is a need to develop a multilayer ceramic capacitor for improving electrical characteristics by improving a connection between the internal electrode and the external electrode and avoiding radial cracks, and preventing hydrogen generated by a chemical reaction in a plating process from penetrating into the body.

SUMMARY

An aspect of the present disclosure is to improve a connection between an internal electrode and an external electrode to improve electrical characteristics of a multilayer electronic component.

An aspect of the present disclosure is to suppress radial cracks generated in a body of a multilayer electronic component.

An aspect of the present disclosure is to suppress penetration of hydrogen into a body.

However, the aspects of the present disclosure are not limited to the above-described contents, and may be more easily understood in the process of describing specific embodiments of the present disclosure.

According to an aspect of the present disclosure, provided is a multilayer electronic component including: a body including a dielectric layer and an internal electrode alternately disposed with the dielectric layer in a first direction, and including Ni; and an external electrode disposed on the body and connected to the internal electrode, wherein the external electrode includes a base electrode layer including Ni and Pd, and the internal electrode includes a first region, and a content of Pd included in the first region is greater than a content of Pd included in a remaining region, excluding the first region in the internal electrode.

According to another aspect of the present disclosure, provided is a multilayer electronic component including: a body including a dielectric layer and an internal electrode alternately arranged with the dielectric layer in a first direction, and including a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction; and an external electrode disposed on the third surface and the fourth surface, wherein the internal electrode includes a first region, and a content of Pd included in the first region is greater than a content of Pd included in a remaining region, excluding the first region in the internal electrode, and the first region is disposed in a region adjacent to an interface between the internal electrode and the external electrode, but the first region is not disposed in a center region of the internal electrode in the second direction.

As one effect of the present disclosure, a connection between an internal electrode and an external electrode may be improved to improve electrical characteristics of a multilayer electronic component.

As one effect of the present disclosure, radial cracks generated in the body of a multilayer electronic component may be suppressed.

As one effect of the present disclosure, a penetration of hydrogen into a body may be suppressed.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
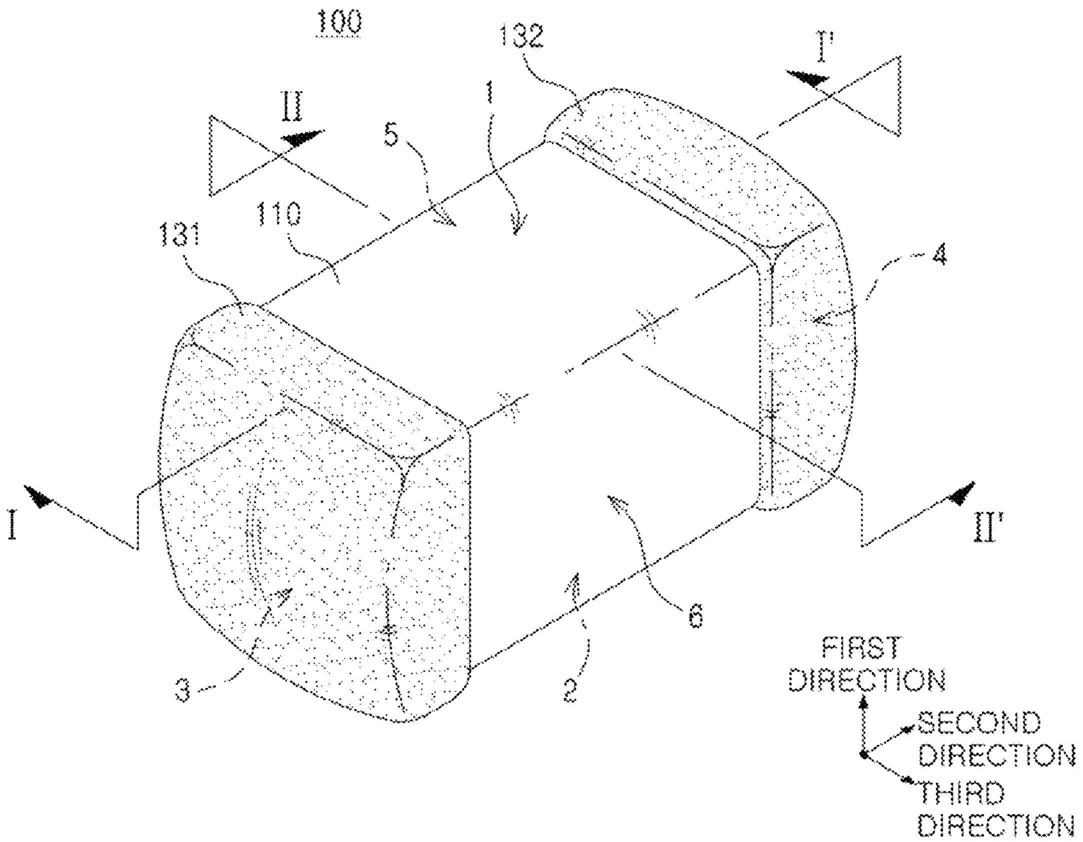
FIG. 1 is a perspective view schematically illustrating a multilayer electronic component according to an example embodiment of the present disclosure.

Hereinafter, example embodiments of the present disclosure will be described with reference to specific example embodiments and the attached drawings. The example embodiments of the present disclosure may, however, be exemplified in many different forms and should not be construed as being limited to the specific embodiments set forth herein. Furthermore, the example embodiments disclosed herein are provided for those skilled in the art to better explain the present disclosure. Accordingly, in the drawings, the shapes and dimensions of elements may be exaggerated for clarity, and the same reference numerals will be used throughout to designate the same or like elements.

Furthermore, in order to clearly describe the present disclosure in the drawings, contents unrelated to the description are omitted, and since sizes and thicknesses of each component illustrated in the drawings are arbitrarily illustrated for convenience of description, the present disclosure is not limited thereto. Furthermore, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an example embodiment of the present disclosure.

Figure 2:
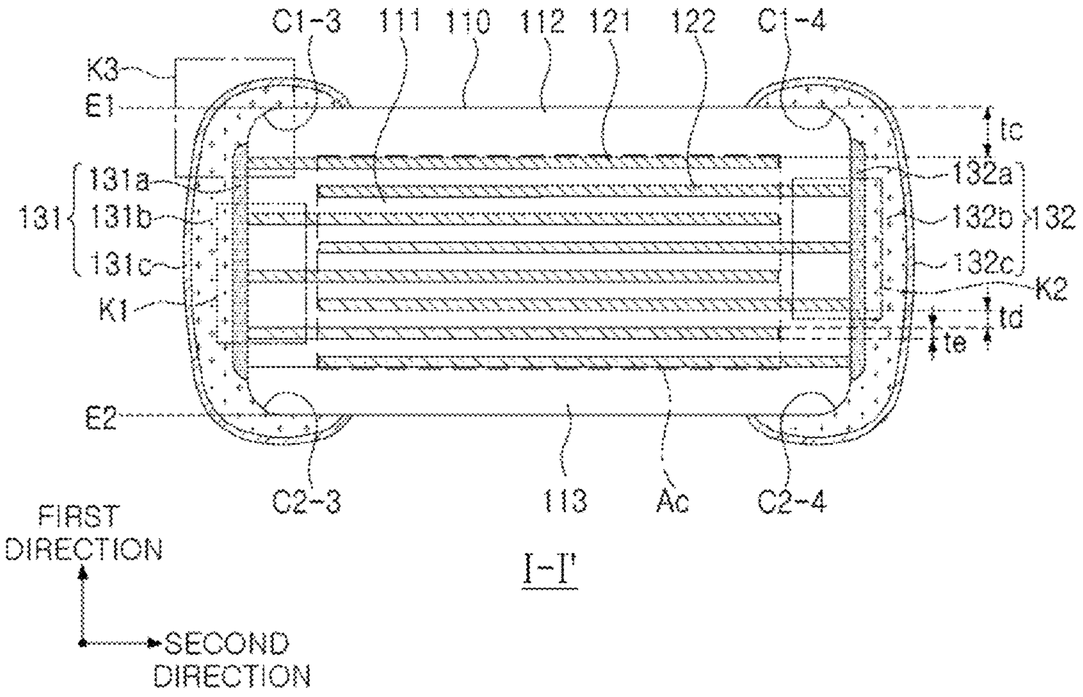
FIG. 2 is a cross-sectional view schematically illustrating a cross-section I-I' of FIG. 1.

FIG. 2 is a cross-sectional view schematically illustrating a cross-section I-I' of FIG. 1.

Figure 3:
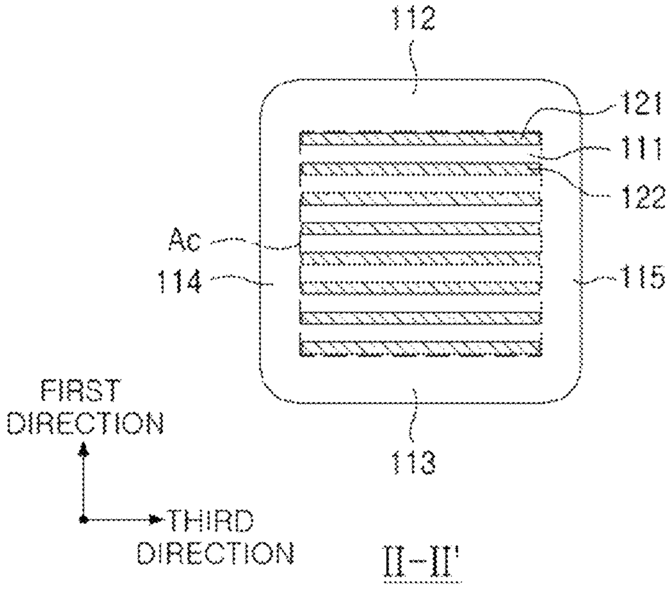
FIG. 3 is a cross-sectional view schematically illustrating a cross-section II-II' of FIG. 1.

FIG. 3 is a cross-sectional view schematically illustrating a cross-section II-II' of FIG. 1.

Figure 4:
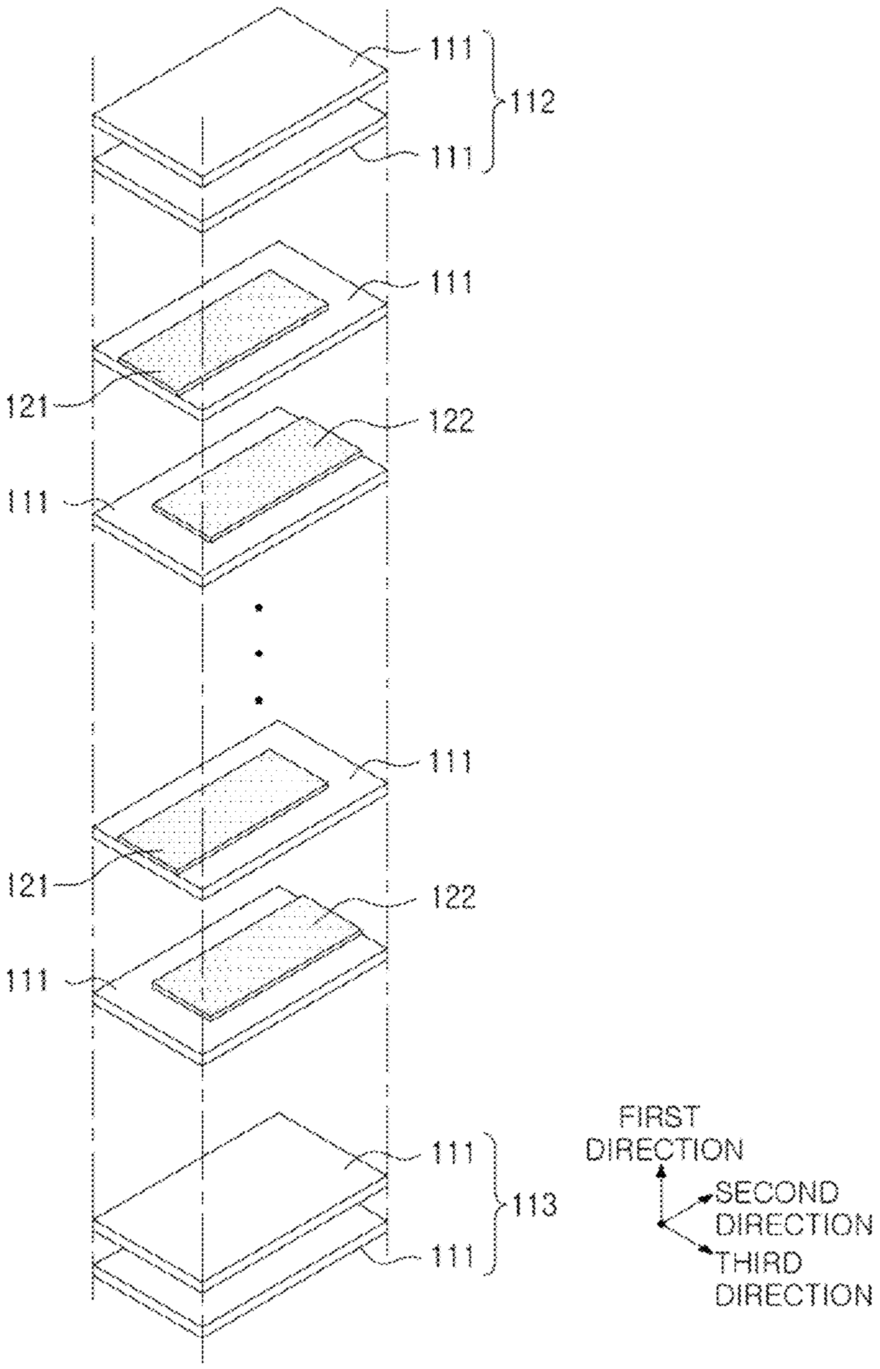
FIG. 4 is an exploded perspective view schematically illustrating a body of a multilayer electronic component according to an example embodiment of the present disclosure.

FIG. 4 is an exploded perspective view schematically illustrating a body of a multilayer electronic component according to an example embodiment of the present disclosure.

Figure 5:
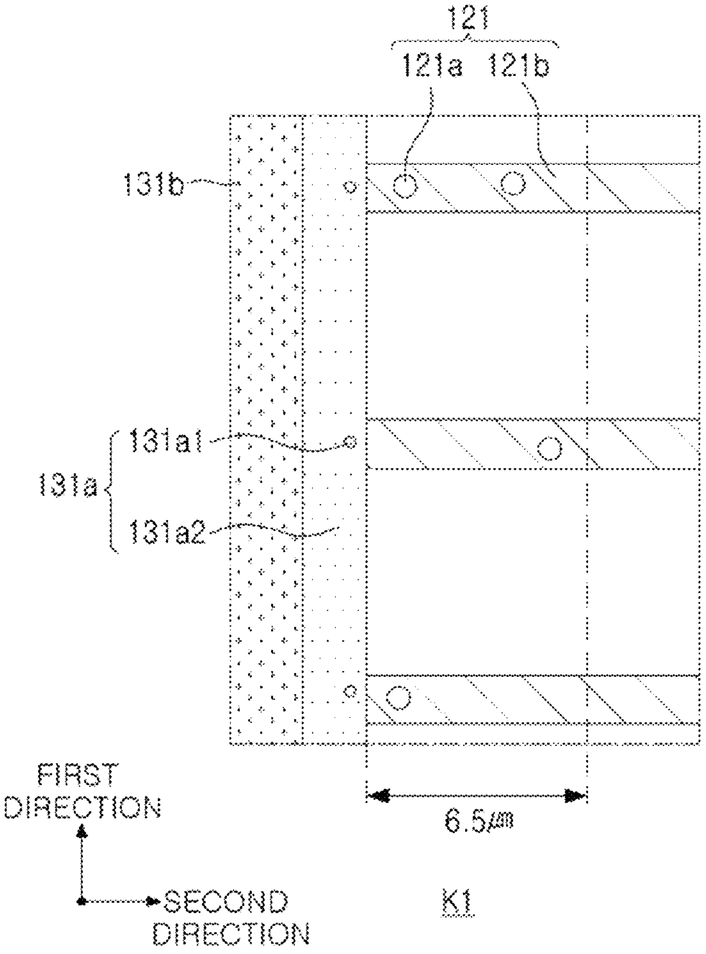
FIG. 5 is an enlarged view of region K1 of FIG. 2.

FIG. 5 is an enlarged view of region K1 of FIG. 2.

Figure 6:
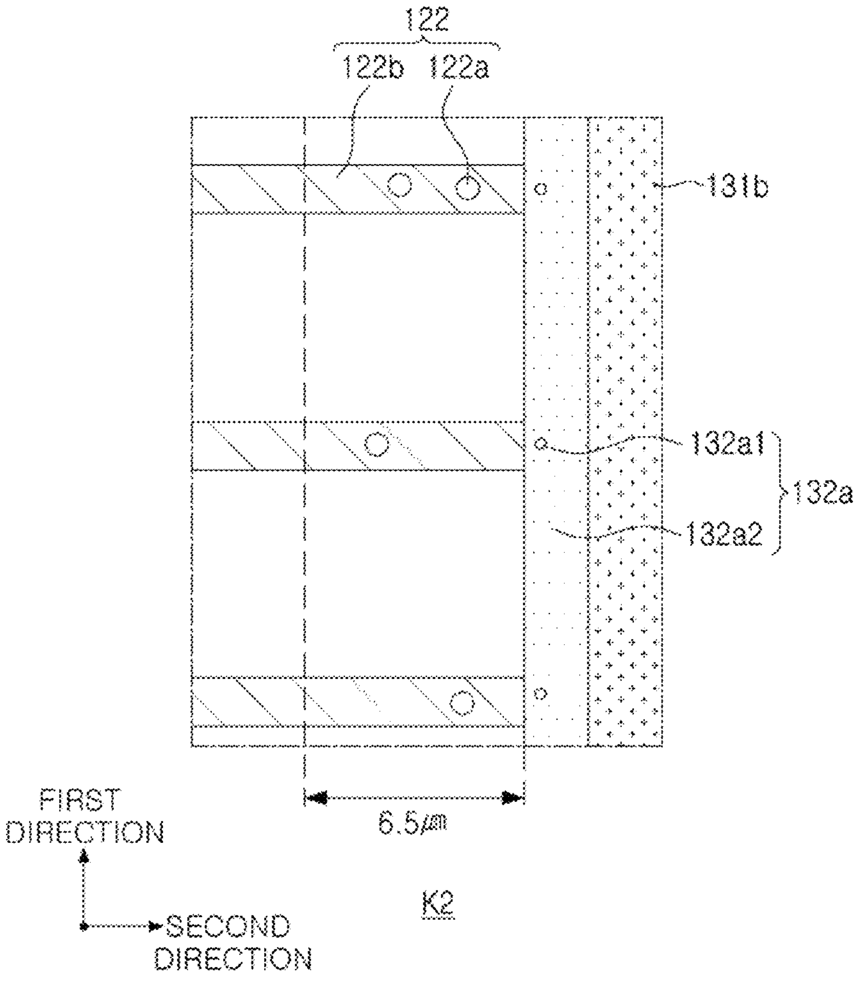
FIG. 6 is an enlarged view of region K2 of FIG. 2.

FIG. 6 is an enlarged view of region K2 of FIG. 2.

Figure 7:
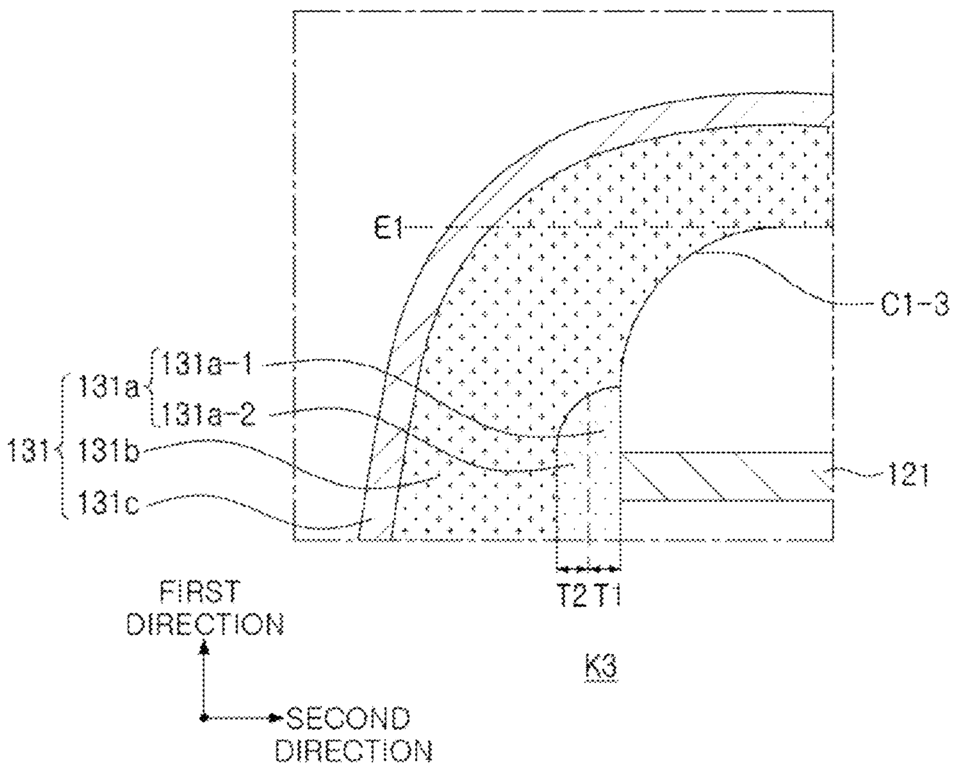
FIG. 7 is an enlarged view of region K3 of FIG. 2.

FIG. 7 is an enlarged view of region K3 of FIG. 2.

Figure 8:
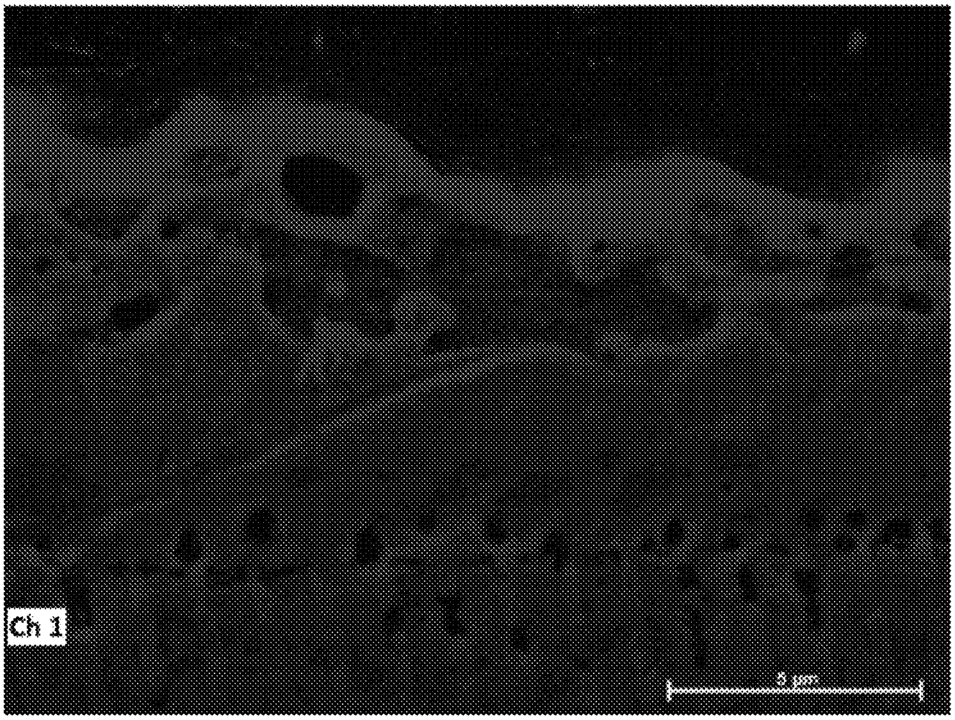
FIG. 8 is an image obtained by capturing a cross-section of a multilayer electronic component according to an example embodiment of the present disclosure with a scanning electron microscope (SEM)

FIG. 8 is an image obtained by capturing a cross-section of a multilayer electronic component according to an example embodiment of the present disclosure with a scanning electron microscope (SEM).

Figure 9:
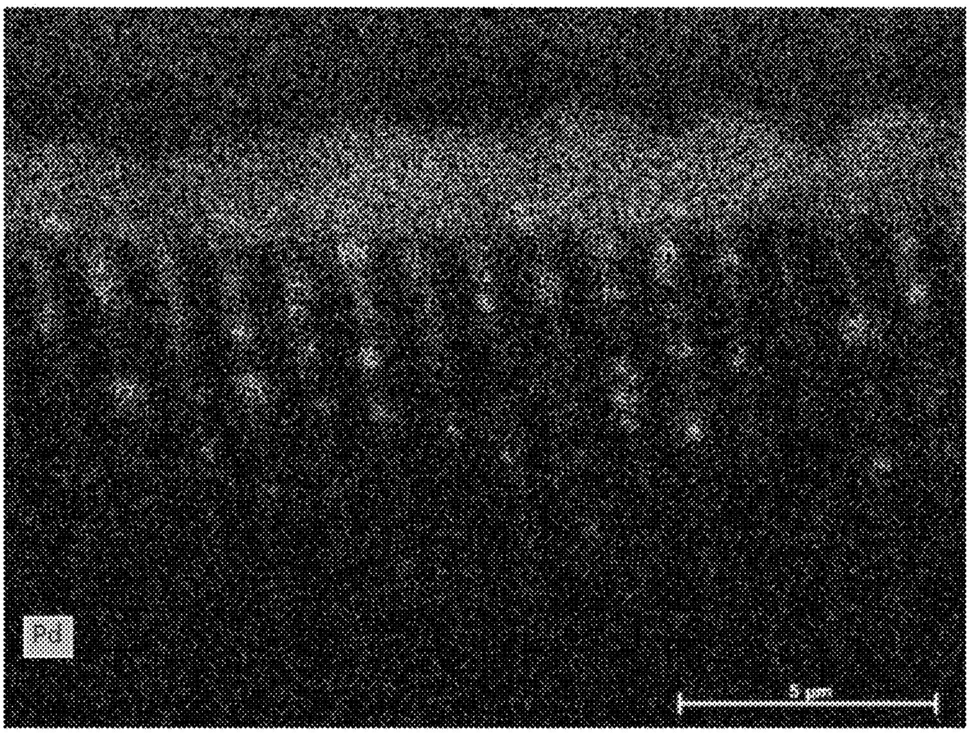
FIG. 9 is an image obtained by mapping Pd elements by analyzing the image of FIG. 8 by energy dispersive spectroscopy (EDS)

FIG. 9 is an image obtained by mapping Pd elements by analyzing the image of FIG. 8 using energy dispersive spectroscopy (EDS).

Hereinafter, a multilayer electronic component 100 according to an example embodiment of the present disclosure will be described in detail with reference to FIGS. 1 to 9. Furthermore, a multilayer ceramic capacitor (hereinafter referred to as 'MLCC') is described as an example of a multilayer electronic component, but the present disclosure is not limited thereto, and may be applied to various multilayer electronic components, such as inductors, piezoelectric devices, varistors, or thermistors.

A multilayer electronic component 100 according to an example embodiment of the present disclosure may include a body 110 including a dielectric layer 111 and internal electrodes 121 and 122 alternately disposed with the dielectric layer in the first direction, and including Ni, and external electrodes 131 and 132 disposed on the body and connected to the internal electrodes, and the external electrode may include base electrode layers 131*a* and 132*a* including Ni and Pd, the internal electrodes may include first regions 121*a* and 122*a*, and a content of Pd included in the first region may be greater than a content of Pd included in the remaining regions 121*b* and 122*b* excluding the first region in the internal electrodes.

As described above, a conventional general multilayer ceramic capacitor may have a problem of reduced connectivity between the internal and external electrodes due to the contraction of the internal electrode during the sintering process, which may lead to a reduction of the electrical characteristics, or occurring of radial cracks due to a diffusion of Cu included in the external electrode to the internal electrode during the sintering process.

In order to solve this problem, a method of forming a plating layer instead of a sintered electrode with a base electrode layer directly connected to the internal electrode can be considered. However, when the base electrode layer is formed as a plating layer, an additional plating process must be performed, and specifically, in order to form the base electrode layer by directly plating Ni on a body by using an electroplating method, excessive plating time is required, which may lead to excessive penetration of hydrogen ions.

On the other hand, according to an example embodiment of the present disclosure, the external electrodes 131 and 132 may include base electrode layers 131*a* and 132*a* including Ni and Pd, the internal electrodes 121 and 122 may include first regions 121*a* and 122*a*, and a content of Pd included in the first region may be greater than a content of Pd included in the remaining regions 121*b* and 122*b* excluding the first region in the internal electrode, thereby improving a connection between the internal electrodes 121 and 122 and the external electrodes 131 and 132 to improve electrical characteristics of the multilayer electronic component, as well as preventing deterioration of insulation resistance by suppressing hydrogen generated during a plating process from penetrating into the body 110.

Hereinafter, each component included in the multilayer electronic component 100 according to an example embodiment of the present disclosure will be described in more detail.

There is no particular limitation on a specific shape of the body 110, but as illustrated, the body 110 may have a hexahedral shape or a shape similar thereto. Due to the shrinkage of ceramic powder particles included in the body 110 during a sintering process or the polishing of corners, the body 110 is not a hexahedral shape with a complete straight line, but may have a substantially hexahedral shape.

The body 110 may have the first surface 1 and the second surface 2 opposing each other in the first direction, the third surface 3 and the fourth surface 4 connected to the first surface 1 and the second surfaced 2 and opposing each other in the second direction, and the fifth surface 5 and the sixth surface 6 connected to the first to fourth surfaces 1, 2, 3 and 4 and opposing each other in the third direction.

The body 110 may include a first-third corner C1-3 connecting the first surface and the third surface, a first-fourth corner C1-4 connecting the first surface and the fourth surface, a second-third corner C2-3 connecting the second surface and the third surface, and a second-fourth corner C2-4 connecting the second surface and the fourth surface. Furthermore, the body 110 may include a first-fifth corners 1-5 connecting the first surface and the fifth surface, a first-sixth corner 1-6 connecting the first surface and the sixth surface, a second-fifth corner connecting the second surface and the fifth surface, and a second-sixth corner connecting the second surface and the sixth surface. The corner may have a round shape by rounding the corner connecting respective surfaces of the body 110 by performing a separate process. The first to sixth surfaces of the body 110 may be substantially flat surfaces, and non-flat areas may be viewed as corners.

In the body 110, the dielectric layer 111 and the internal electrodes 121 and 122 may be alternately stacked. Since a plurality of dielectric layers 111 forming the body 110 are in a sintered state, a boundary between adjacent dielectric layers 111 may be integrated to the extent that the boundary may be difficult to confirm without using a scanning electron microscope (SEM).

The dielectric layer 111 may be formed by preparing a ceramic slurry including ceramic powder particles, an organic solvent, and a binder, applying and drying the slurry on a carrier film to prepare a ceramic green sheet, and then sintering the ceramic green sheet. The ceramic powder particles are not particularly limited as long as they can obtain sufficient capacitance, but for example, barium titanate-based materials, lead composite perovskite-based materials, or strontium titanate-based materials may be used for the ceramic powder particles, and examples of the ceramic powder particles may include $BaTiO_3$, and $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$), which is formed by partially employing calcium (Ca) and zirconium (Zr) in $BaTiO_3$.

An average thickness td of the dielectric layer 111 is not particularly limited, but for example, the average thickness may be 10 μm or less. Furthermore, the average thickness td of the dielectric layer 111 may be arbitrarily set according to desired characteristics or use. For example, for a high-voltage electronic component, the average thickness td of the dielectric layer 111 may be less than 2.8 μm, and for a small IT electronic component, the average thickness td of the dielectric layer 111 may be 0.4 μm or less so as to achieve miniaturization and high capacitance, but the present disclosure is not limited thereto.

In general, as the thickness of the dielectric layer 111 decreases, radiating cracks may be easily generated in the body 110 due to stress generated when voltage is applied, and insulation resistance may easily deteriorate due to hydrogen penetrating into the body 110, which may reduce the reliability of the multilayer electronic component. On the other hand, in the case of a multilayer electronic component according to an example embodiment of the present disclosure, since the external electrodes 131 and 132 include base electrode layers 131*a* and 132*a* including Ni and Pd, and the internal electrodes 121 and 122 include the first regions 121*a* and 122*a*, the radial cracks may be prevented from being generated in the body 110, and hydrogen may be suppressed from penetrating into the body 110, and accordingly, even when the average thickness td of the dielectric layer 111 is less than 2.8 μm or 0.4 μm or less, the reliability of the multilayer electronic component may be secured.

In this case, the average thickness td of the dielectric layer 111 refers to the size of the dielectric layer 111 disposed between the internal electrodes 121 and 122 in the first direction. The average thickness of the dielectric layer 111 may be measured by scanning a cross section of the body 110 in the first and second directions with a scanning electron microscope (SEM) at a magnification of 10,000. More specifically, an average value may be measured by measuring the thickness at a plurality of points of one dielectric layer 111, for example, 30 points which are spaced apart from each other at equal intervals in the second direction. The 30 points spaced apart from each other at equal intervals may be designated in a capacitance formation portion Ac to be described below. In addition, when the average value is measured by extending an average value measurement up to 10 dielectric layers 111, the average thickness of the dielectric layer 111 may be further generalized.

The body 110 may include a capacitance formation portion Ac disposed inside the body 110 and in which capacitance is formed by including first and second internal electrodes 121 and 122 alternately disposed with the dielectric layer 111 interposed therebetween, and a first cover portion 112 and a second cover portion 113 respectively disposed on both surfaces of the capacitance formation portion Ac opposing each other in the first direction. The cover portions 112 and 113 may basically serve to prevent damage to the internal electrodes due to physical or chemical stress. The cover portions 112 and 113 may have the same configuration as the dielectric layer 111 except that they do not include the internal electrodes.

A thickness tc of the cover portions 112 and 113 are not particularly limited. However, for miniaturization and high capacitance of the multilayer electronic component, the average thickness tc of the cover portions 112 and 113 may be 100 μm or less, 30 μm or less, or 20 μm or less. Here, the average thickness tc of the cover portions 112 and 113 denote an average thickness of each of the first cover portion 112 and the second cover portion 113.

The average thickness tc of the cover portions 112 and 113 may refer to an average size of the cover portions 112 and 113 in the first direction, and may be a value obtained by averaging sizes in the first direction measured at five points spaced apart t from each other at equal intervals in the cross-section of the body 110 in the first and second direction.

The body 110 may include a first margin portion 114 and a second margin portion 115 respectively disposed on both surfaces facing the capacitance formation portion Ac in the third direction. That is, the margin portions 114 and 115 may refer to regions between both ends of the internal electrodes 121 and 122 and boundary surfaces of the body 110 in cross-sections in which the body 110 is cut in the first direction and the third direction.

The margin portions 114 and 115 may include the same material as the dielectric layer 111 except that they do not include the internal electrodes 121 and 122. The margin portions 114 and 115 may serve to prevent damage to the internal electrodes 121 and 122 due to physical or chemical stress.

The margin portions 114 and 115 may be formed by applying and sintering a conductive paste for an internal electrode except for a position in which the margin portions will be formed on the ceramic green sheet. Alternatively, in order to suppress a step portion caused by the internal electrodes 121 and 122, the internal electrodes 121 and 122 may be stacked and then cut to be connected to the fifth surface 5 and the sixth surface 6 of the body, and then, the margin portions 114 and 115 may be formed by stacking a single dielectric layer or two or more dielectric layers on both surfaces of the capacitance formation portion Ac opposing each other in the third direction.

The average thickness of the margin portions 114 and 115 are not particularly limited. However, for miniaturization and high capacitance of the multilayer electronic component, the average thickness of the margin portions 114 and 115 may be 100 μm or less, 20 μm or less, or 15 μm or less. Here, the average thickness of the margin portions 114 and 115 refers to an average thickness of each of the first margin portion 114 and the second margin portion 115.

The average thickness of the margin portions 114 and 115 may denote an average size of the margin portions 114 and 115 in the third direction, and may be a value obtained by averaging sizes in the third direction measured at five points spaced apart from each other at equal intervals in the cross-sections of the body 110 in first direction and the third direction.

The internal electrodes 121 and 122 may be alternately disposed with the dielectric layer 111, and for example, a pair of electrodes with different polarities, i.e., the first internal electrode 121 and the second internal electrode 122, may be alternately disposed with the dielectric layer 111 interposed therebetween. The first internal electrode 121 and the second internal electrode 122 may be electrically separated from each other by the dielectric layer 111 disposed therebetween.

The first internal electrode 121 may be spaced apart from the fourth surface 4 and may be disposed to be connected to the third surface 3. Furthermore, the second internal electrode 122 may be spaced apart from the third surface 3 and may be disposed to be connected to the fourth surface 4.

Conductive metals included in the internal electrodes 121 and 122 may be at least one of nickel (Ni), copper (Cu), palladium (Pd), silver (Ag), gold (Au), platinum (Pt), tin (Sn), tungsten (W), titanium (Ti), and alloys thereof, and the internal electrodes 121 and 122 may include Ni.

The internal electrodes 121 and 122 may be formed by applying a conductive paste for internal electrodes including a conductive metal by a predetermined thickness on a ceramic green sheet and sintering the conductive paste. A printing method for the conductive paste for internal electrodes may be a screen-printing method or a gravure printing method, but the present disclosure is not limited thereto.

As illustrated in FIGS. 5 and 6, the internal electrodes 121 and 122 of the multilayer electronic component 100 according to an example embodiment of the present disclosure may include first regions 121*a* and 122*a*, and a content of Pd included in the first regions 121*a* and 122*a* may be greater than a content of Pd included in the remaining regions 121*b* and 122*b* excluding the first regions 121*a* and 122*a* in the internal electrodes 121 and 122. Here, the content of Pd may denote an atomic percentage (at %) measured by Energy Distributed Spectroscopy (EDS), and the content of Pd included in the remaining regions 121*b* and 122*b* excluding the first regions 121*a* and 122*a* in the internal electrodes 121 and 122 may denote an average content of Pd included in the remaining regions excluding the first region.

The Pd may serve to lower a hydrogen diffusion coefficient in a metal including Ni as a main component. Accordingly, the internal electrodes 121 and 122 may include the first regions 121*a* and 122*a* having a relatively high Pd content, thereby preventing hydrogen from penetrating into the internal electrodes 121 and 122, and preventing hydrogen penetrating the internal electrodes from deteriorating the insulation resistance by reducing the dielectric layer 111. On the other hand, the hydrogen refers mainly to hydrogen generated by a chemical reaction during a plating process, and hydrogen present as water generated by a plating solution or as water vapor in the atmosphere may be included therein. Here, the plating process may refer to a process of forming plating layers 131*c* and 132*c* to be described below, but when the base electrode layers 131*a* and 132*a* are formed by a plating method, the plating process is a concept including a process of forming the base electrode layers 131*a* and 132*a*.

The first regions 121*a* and 122*a* may be present in the internal electrodes 121 and 122 in a sphere shape, but the present disclosure is not limited thereto, and the first regions 121*a* and 122*a* may have various shapes, for example, a flake shape or the like.

In an example embodiment, the content of Pd included in the first regions 121*a* and 122*a* may be 0.5 at % or more. When the content of Pd included in the first regions 121*a* and 122*a* is less than 0.5 at %, the above-described hydrogen penetration prevention effect may be insignificant. An upper limit of the content of Pd included in the first regions 121*a* and 122*a* is not particularly limited, but may be, for example, 3.0 at % or less. Meanwhile, an average content of Pd included in the remaining regions 121*b* and 122*b* excluding the first regions 121*a* and 122*a* in the internal electrodes 121 and 122 is not particularly limited, but may be, for example, 0.2 at % or less.

Meanwhile, Pd included in the first regions 121*a* and 122*a* may be present in the form of an alloy with Ni, and the first regions 121*a* and 122*a* may include Ni having a content greater than the content of Pd included in the first region. When the content of Pd included in the first regions 121*a* and 122*a* is greater than a content of Ni, since the type of metals included as a main component change, the hydrogen diffusion coefficient may be increased to lead to a decrease in the effect of preventing hydrogen penetration of the present disclosure.

In an example embodiment, at least one of the internal electrodes 121 and 122 may include the first regions 121*a* and 122*a* in plural form. Since at least one of the internal electrodes 121 and 122 include a plurality of first regions 121*a* and 122*a*, hydrogen may be more effectively prevented from penetrating into the body 110.

In an example embodiment, the first regions 121*a* and 122*a* may be disposed within 6.5 μm in the second direction from an interface between the internal electrodes 121 and 122 and the external electrodes 131 and 132. That is, the first regions 121*a* and 122*a* may be disposed in a region adjacent to the interface between the internal electrodes 121 and 122 and the external electrodes 131 and 132, thereby effectively suppressing hydrogen from penetrating into the body 110. When the first regions 121*a* and 122*a* are disposed at a region separated by 6.5 μm or more from the interface between the internal electrodes 121 and 122 and the external electrodes 131 and 132 in the second direction, because the first region cannot exhibit an effect of preventing penetration of hydrogen ions generated during the plating process, the hydrogen penetration prevention effect of the present disclosure may be insignificant.

Meanwhile, a method of forming first regions 121*a* and 122*a* in the internal electrodes 121 and 122 are not particularly limited. Hereinafter, as a preferred example, a method of forming the first regions 121*a* and 122*a* will be described. First, after a Pd seed is formed in an end of the internal electrodes 121 and 122, a heat treatment process may be performed. The heat treatment may be performed at a temperature of, for example, 150° C. to 1100° C. for 15 minutes to 360 minutes. Next, Ni may be grown from the Pd Seed using an electroplating method to form basic electrode layers 131*a* and 132*a* to be described below, and then, an additional heat treatment may be performed on the base electrode layers. The additional heat treatment may be performed at a temperature of 150° C. to 1100° C. for 15 minutes to 360 minutes. That is, the base electrode layers 131*a* and 132*a* may be plating layers including Ni and Pd. A series of heat treatment processes may induce the diffusion of Pd disposed at the end of the internal electrodes, thereby forming the first regions 121*a* and 122*a*. Meanwhile, the plating time may be shortened by forming the Pd seed in the end of the internal electrode and performing the heat treatment process before forming the base electrode layer, and accordingly, hydrogen ions generated during the plating process may be suppressed from penetrating into the body, as compared to a case of forming the plating layer without the Pd seed.

A preferred example of a method of measuring a content of Pd included in the first regions 121*a* and 122*a* and a content of Pd included in the remaining regions 121*b* and 122*b* excluding the first regions 121*a* and 122*a* in the internal electrodes 121 and 122 is described as follows. As illustrated in FIGS. 8 and 9, after acquiring images obtained by capturing the first and second directional cross-sections of the body 110 cut in the center of the third direction with a scanning electron microscope (SEM), the images are mapped to Pd elements through energy dispersive spectroscopy (EDS). In this case, in the image mapped to the Pd element, a region having a high Pd content may appear relatively bright, and a region having a low Pd content may appear relatively dark. Here, a region that appears bright due to a relatively high content of Pd may be defined as the first regions 121*a* and 122*a*.

On the other hand, the content of Pd included in the first regions 121*a* and 122*a* may denote a content of Pd measured in a central region of the first regions 121*a* and 122*a* that appear relatively bright when mapping the Pd elements through the SEM-EDS analysis. Furthermore, the content of Pd included in the remaining regions 121*b* and 122*b* excluding the first regions in the internal electrodes 121 and 122 may denote an average value of the Pd content measured at any 10 points among the regions of the internal electrodes 121 and 122 excluding the first regions. For example, the 10 points may be designated in a region separated by 6.5 μm or more in the second direction from the interface between the internal electrodes 121 and 122 and the external electrodes 131 and 132.

An average thickness te of the internal electrodes 121 and 122 is not particularly limited, but may be, for example, 3 μm or less. Furthermore, the average thickness te of the internal electrodes 121 and 122 may be arbitrarily set according to desired characteristics or use. For example, for a high-voltage electronic component, the average thickness te of the internal electrodes 121 and 122 may be less than 1 μm, and for a small IT electronic component, the average thickness te of the internal electrodes 121 and 122 may be 0.4 μm or less so as to achieve miniaturization and high capacitance, but the present disclosure is not limited thereto.

Meanwhile, as described above, in the case of a multilayer electronic component according to an example embodiment of the present disclosure, since the external electrodes 131 and 132 include base electrode layers 131*a* and 132*a* including Ni and Pd, and the internal electrodes 121 and 122 include the first regions 121*a* and 122*a*, the reliability of the multilayer electronic component may be secured even when the average thickness te of the internal electrodes 121 and 122 is less than 1 μm or less than 0.4 μm.

The average thickness te of the internal electrodes 121 and 122 means a size of the internal electrodes 121 and 122 in the first direction. Here, the average thickness of the internal electrodes 121 and 122 may be measured by scanning an image of the first and second directional cross sections of the body 110 with a scanning electron microscope (SEM) at 10,000× magnification. More specifically, the average value may be measured by measuring the thickness at a plurality of points of one internal electrode 121 or 122, e.g., at 30 points spaced apart from each other at equal intervals in the second direction. The 30 points, which are spaced apart from each other at equal intervals, may be designated by the capacitance formation portion Ac. In addition, when the average value is measured by extending an average value measurement up to 10 internal electrodes 121 and 122, the average thickness of the internal electrodes 121 and 122 may be further generalized.

The external electrodes 131 and 132 may be disposed on the third surface 3 and the fourth surface 4 of the body 110, and may extend onto portions of the first surface, the second surface, the fifth surface, and the sixth surface. Furthermore, the external electrodes 131 and 132 may include a first external electrode 131 connected to a first internal electrode 121 and a second external electrode 132 connected to a second internal electrode 122.

According to an example embodiment of the present disclosure, the external electrodes 131 and 132 may include base electrode layers 131*a* and 132*a* including Ni and Pd, and the base electrode layers 131*a* and 132*a* may include a first base electrode layer 131*a* connected to the first internal electrode 121, and a second base electrode layer 132*a* connected to the second internal electrode 122.

The base electrode layers 131*a* and 132*a* may include Ni and Pd, thus improving the density of the base electrode layers 131*a* and 132*a*, and Pd may be highly alloyable with Ni, thus forming a solid solution. Accordingly, a connection between the internal electrodes 121 and 122 and the external electrodes 131 and 132 may be improved. Furthermore, in a conventional case, there has been a problem that Cu of the external electrode diffuses into the internal electrode to cause the radial cracks, but in the case of an example embodiment of the present disclosure, since the base electrode layers 131*a* and 132*a* include Ni and Pd, an occurrence of the radial cracks in the body may be suppressed.

Meanwhile, in order to more effectively suppress the radial cracks caused by a difference in diffusion rate of metals included in the internal electrodes 121 and 122 and the base electrode layers 131*a* and 132*a*, each of the internal electrodes 121 and 122 and the base electrode layers 131*a* and 132*a* may include Ni as a main component.

Furthermore, as described above, the base electrode layers 131*a* and 132*a* may be plating layers including Ni and Pd. When the base electrode layers 131*a* and 132*a* are the plating layers including Ni and Pd, the connection between the internal electrodes and the external electrodes may be improved as compared to a conventional sintered electrode sintered after applying a paste including Cu and glass, thereby improving electrical characteristics of the multilayer electronic component.

In an example embodiment, the base electrode layers 131*a* and 132*a* may include second regions 131*a*1 and 132*a*1, and a content of Pd included in the second region may be greater than a content of Pd included in the remaining regions 131*a*2 and 132*a*2 excluding the second region in the base electrode layer. The content of Pd included in the remaining regions 131*a*2 and 132*a*2 excluding the second regions 131*a*1 and 132*a*1 in the base electrode layers 131*a* and 132*a* may denote an average content of Pd included in the remaining region, excluding the second region.

As described above, the Pd may serve to lower a hydrogen diffusion coefficient in a metal including Ni as a main component, and accordingly, since the base electrode layers 131*a* and 132*a* include the second regions 131*a*1 and 132*a*1 with a relatively high Pd content, hydrogen may be prevented from penetrating into the body 110.

Meanwhile, the second regions 131*a*1 and 132*a*1 may exist in the form of spheres in the base electrode layers 131*a* and 132*a*, but the present disclosure is not limited thereto, and the second regions 131*a*1 and 132*a*1 may have various shapes, for example, a flake shape or the like.

In an example embodiment, the base electrode layers 131*a* and 132*a* may include the second regions 131*a*1 and 132*a*1 in plural form. Since the base electrode layer includes a plurality of the second regions, hydrogen may be more effectively prevented from penetrating into the body 110.

A preferred example of a method of measuring a content of Pd included in the second regions 131*a*1 and 132*a*1 and a content of Pd included in the remaining regions 131*a*2 and 132*a*2 excluding the second regions 131*a*1 and 132*a*1 in the base electrode layers 131*a* and 132*a* is described as follows. After acquiring images obtained by capturing first and second directional cross-sections of the external electrodes 131 and 132 cut in the center of the body 110 with a scanning electron microscope (SEM), the images are mapped to Pd elements through energy dispersive spectroscopy (EDS). In this case, in the image mapped to the Pd element, a region having a high Pd content may appear relatively bright, and a region having a low Pd content may appear relatively dark. Here, a region that appears bright due to a relatively high content of Pd may be defined as the second regions 131*a*1 and 132*a*1.

On the other hand, the content of Pd included in the second regions 131*a*1 and 132*a*1 may denote a content of Pd measured in a central region of the second regions 131*a*1 and 132*a*1 that appear relatively bright when mapping the Pd elements through the SEM-EDS analysis. Furthermore, the content of Pd included in the remaining regions 131*a*2 and 132*a*2 excluding the second regions in the base electrode layers 131*a* and 132*a* may denote an average value of the Pd content measured at any 10 points among the regions of the base electrode layers 131*a* and 132*a* excluding the second region.

In an example embodiment, the base electrode layers 131*a* and 132*a* may include a first layer adjacent to the body 110 (e.g., disposed to be in contact with the body 110) and a second layer disposed on the first layer, and the content of Pd included in the first layer may be greater than the content of Pd included in the second layer. Hereinafter, referring to FIGS. 7 to 9, an example embodiment is described based on the first base electrode layer 131*a*, but since the first base electrode layer 131*a* and the second base electrode layer 132*a* may be in a symmetrical relationship with respect to the second direction, the description of the first base electrode layer 131*a* is considered to include the description of the second base electrode layer 132*a*.

Referring to FIGS. 7 to 9, the first base electrode layer 131*a* may include a first layer 131*a*-1 adjacent to the body 110 and a second layer 131*a*-2 disposed on the first layer, and the content of Pd included in the first layer may be greater than the content of Pd included in the second layer. The content of Pd included in the first layer 131*a*-1 may be greater than the content of Pd included in the second layer 131*a*-2, thereby further improving an effect of improving the connection between the internal electrodes and the external electrodes, an effect of preventing the radial cracks and an effect of suppressing hydrogen from penetrating into the body. Meanwhile, the second region 131*a*1 of the first base electrode layer 131*a* may be disposed in the first layer 131*a*-1, but the present disclosure is not limited thereto.

A boundary between the first layer 131*a*-1 and the second layer 131*a*-2 may be distinguished and recognized from a mapping image of the Pd elements obtained by analyzing the first and second directional cross-sections of the external electrodes 131 and 132 cut in a third directional center of the body 110 with the SEM-EDS. That is, since the first layer 131*a*-1 has a higher Pd content than the second layer 131*a*-2, as illustrated in FIG. 9, the boundary between the first layer 131*a*-1 and the second layer 131*a*-2 may be a point at which the distribution of the Pd elements is rapidly changed.

Meanwhile, a thickness T1 of the first layer 131*a*-1 and a thickness T2 of the second layer 131*a*-2 are not particularly limited, but in an example embodiment, T1>T2 may be satisfied. By satisfying T1>T2, the effect of improving the connection between the internal electrodes and the external electrodes, the effect of preventing the radial cracks and the effect of suppressing hydrogen from penetrating into the body may be further improved. T1 is not particularly limited, but may be, for example, 1.5 μm to 2.0 μm. Here, T1 may denote a thickness of the first layer 131*a*-1 in a central region in the first direction, and T2 may denote a thickness of the second layer 131*a*-2 in a central region in the first direction.

Meanwhile, a method of forming the second regions 131*a*1 and 132*a*1 and a method of controlling a content of Pd included in the first layer 131*a*-1 and the second layer 131*a*-2 are not particularly limited. As described above, after forming a Pd seed in the ends of the internal electrodes 121 and 122, Ni may be grown from the Pd seed using a heat treatment process and an electroplating method to form the base electrode layers 131*a* and 132*a*, and then, the diffusion of the Pd seed disposed at the ends of the internal electrodes may be induced through a process of an additional heat treatment on the base electrode layer, and the content of Pd forming the second regions 131*a*1 and 132*a*1 and included in the first layer 131*a*-1 may be controlled to be greater than the content of Pd included in the second layer 131*a*-2.

In an example embodiment, the base electrode layers 131*a* and 132*a* may be disposed between an extension line E1 of the first surface and an extension line E2 of the second surface. In other words, the base electrode layers 131*a* and 132*a* are disposed between a plane along which the first surface is formed and a plane along which the second surface is formed. As described above, when the base electrode layers 131*a* and 132*a* are plating layers formed using the electroplating method, the base electrode layer may not include glass. In this case, when the base electrode layers 131*a* and 132*a* extend to the first surface beyond the extension line E1 of the first surface or extend to the second surface beyond the extension line E2 of the second surface, there may be a problem such as delamination between the base electrode layers 131*a* and 132*a* that do not include glass and the body 110.

The external electrodes 131 and 132 may include intermediate electrode layers 131*b* and 132*b* disposed on the base electrode layers 131*a* and 132*a*. For example, the first external electrode 131 may include a first intermediate electrode layer 131*b* disposed on the first base electrode layer 131*a*, and the second external electrode 132 may include a second intermediate electrode layer 132*b* disposed on the second base electrode layer 132*a*.

The intermediate electrode layers 131*b* and 132*b* may include a conductive metal and glass. The conductive metal included in the intermediate electrode layers 131*b* and 132*b* may serve to ensure electrical connectivity, and the glass may serve to improve bonding force with the body.

The metal included in the intermediate electrode layers 131*b* and 132*b* may be formed of any material as long as the material has electrical conductivity, and a specific material may be determined in consideration of electrical properties, structural stability, and the like. For example, the metal included in the electrode layers 131*b* and 132*b* may be at least one selected from the group consisting of nickel (Ni), copper (Cu), palladium (Pd), silver (Ag), gold (Au), platinum (Pt), tin (Sn), tungsten (W), titanium (Ti), and alloys thereof.

However, when the conductive metal included in the intermediate electrode layers 131*b* and 132*b* is Cu, an effect of suppressing elements included in the intermediate electrode layers 131*b* and 132*b* from being diffused to the internal electrode according to an arrangement of the base electrode layers may be more remarkably improved. Accordingly, in an example embodiment, the intermediate electrode layers 131*b* and 132*b* may include Cu and glass.

Furthermore, when the conductive metal included in the intermediate electrode layers 131*b* and 132*b* is Cu, a Ni—Cu alloy layer may be disposed at an interface between the base electrode layers 131*a* and 132*a* and the intermediate electrode layers 131*b* and 132*b*. Accordingly, bonding force between the base electrode layers 131*a* and 132*a* and the intermediate electrode layers 131*b* and 132*b* may be improved.

In an example embodiment, the intermediate electrode layers 131*b* and 132*b* may extend to at least a portion of the first surface 1 and the second surface 2. Since the intermediate electrode layers 131*b* and 132*b* include glass, they may have excellent bonding force with the body 110, and since the intermediate electrode layers 131*b* and 132*b* extend to at least a portion of the first surface 1 and the second surface 2, they may be disposed to cover the base electrode layers 131*a* and 132*a*, thereby improving the bonding force between the body 110 and the external electrodes 131 and 132.

The intermediate electrode layers 131*b* and 132*b* may consist of one layer including a conductive metal and glass, but the present disclosure is not limited thereto, and the intermediate electrode layers 131*b* and 132*b* may have a multilayer structure.

For example, the first intermediate electrode layer 131*b* may include a first-first intermediate electrode layer including the conductive metal and the glass, and a first-second intermediate electrode layer disposed on the first-first intermediate electrode layer and including the conductive metal and a resin. Furthermore, the second intermediate electrode layer 132*b* may include a second-first intermediate electrode layer including the conductive metal and the glass, and a second-second intermediate electrode layer disposed on the second-first intermediate electrode layer and including the conductive metal and the resin. Since the first-second intermediate electrode layer and the second-second intermediate electrode layer including the conductive metal and the resin are included, the bending strength of the multilayer electronic component may be improved.

The conductive metal included in the first-second intermediate electrode layer and the second-second intermediate electrode layer is not particularly limited, and may include at least one selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal included in the first-second intermediate electrode layer and the second-second intermediate electrode layer may include at least one of spherical powder particles and flake powder particles. That included in the first-second is, the conductive metal intermediate electrode layer and the second-second intermediate electrode layer may be formed of only flake powder particles or spherical powder particles, and may be a mixture of the flake powder particles and the spherical powder particles. Here, the spherical powder particles may include a shape that is not completely spherical, and may include, for example, a shape in which a length ratio (long axis/short axis) of a long axis and a short axis is 1.45 or less. The flake powder particles refers to powder particles having a flat and elongated shape and is not particularly limited, but the length ratio (long axis/short axis) of the long axis and the short axis may be, for example, 1.95 or more. A length of the long axis and the short axis of the spherical powder particles and the flake powder particles may be measured from images obtained by scanning the first and second directional cross-sections cut in the center of the multilayer electronic component in the third direction with a scanning electron microscope (SEM).

The resin included in the first-second intermediate electrode layer and the second-second intermediate electrode layer may ensure adhesion and absorb impacts. The resin is not particularly limited as long as the region has adhesive properties and impact absorption and may be mixed with conductive metal powder particles to form a paste, and the resin may include, for example, one or more selected from an epoxy resin, an acrylic resin, and ethyl cellulose.

Furthermore, the first-second intermediate electrode layer and the second-second intermediate electrode layer may include a plurality of metal particles, an and a resin. An electrical intermetallic compound, connection between the first-first intermediate electrode layer and the second-first intermediate electrode layer may be further improved by including the intermetallic compound. The intermetallic compound may serve to improve an electrical connection by connecting a plurality of metal particles, and may serve to surround and connect a plurality of metal particles to each other.

In this case, the intermetallic compound may include a metal having a melting point lower than a curing temperature of the resin. That is, since the intermetallic compound includes a metal having a melting point lower than the curing temperature of the resin, the metal having a melting point lower than the curing temperature of the resin is melted during a drying and curing process, the intermetallic compound is formed with some of the metal particles to surround the metal particles. In this case, the intermetallic compound may include a low melting point metal of 300° C. or less.

In an example embodiment, the first-second intermediate electrode layer and the second-second intermediate electrode layer may include Sn. Sn is melted during the drying and curing process, the molten Sn wets high melting point metal particles such as Ag, Ni, or Cu by a capillary phenomenon and reacts with some of Ag, Ni, or Cu metal particles to form intermetallic compounds such as $Ag_3Sn$, $Ni_3Sn_4$, $Cu_6Sn_5$, and $Cu_3Sn$. Ag, Ni, or Cu not participating in the reaction remain in the form of metal particles.

Accordingly, the plurality of metal particles may include at least one of Ag, Ni, and Cu, and the intermetallic compound may include at least one of $Ag_3Sn$, $Ni_3Sn_4$, $Cu_6Sn_5$, $Cu_3Sn$.

The external electrodes 131 and 132 may include plating layers 131*c* and 132*c* disposed on the intermediate electrode layers 131*b* and 132*b*. The first external electrode 131 may include a first plating layer 131*c* disposed on the first electrode layer 131*b*, and the second external electrode 132 may include a second plating layer 132*c* disposed on the second electrode layer 132*b*.

The plating layers 131*c* and 132*c* may improve mounting characteristics. The type of the plating layers 131*c* and 132*c* is not particularly limited, and may be a plating layer including Ni, Sn, Pd, and/or an alloy including the same, or may be formed of a plurality of layers. The plating layers 131*c* and 132*c* may be, for example, a Ni plating layer or a Sn plating layer, and may have a form in which the Ni plating layer and the Sn plating layer are sequentially formed. Furthermore, the plating layers 131*c* and 132*c* may include a plurality of Ni plating layers and/or a plurality of Sn plating layers.

Although the drawings illustrate a structure in which the multilayer electronic component 100 has two external electrodes 131 and 132, the present invention is not limited thereto, and the number or shape of the external electrodes 131 and 132 may be changed according to the shape or other purpose of the internal electrodes 121 and 122.

Hereinafter, a multilayer electronic component according to another example embodiment of the present disclosure will be described. However, the multilayer electronic component according to an example embodiment of the present disclosure may have the same configuration as the multilayer electronic component according to an example embodiment of the present disclosure described above. Accordingly, a description overlapping the aforementioned example embodiment of the present disclosure will be omitted.

The multilayer electronic component 100 according to another example embodiment of the present disclosure may include a body 110 including a dielectric layer 111 and internal electrodes 121 and 122 alternately disposed with the dielectric layer in the first direction, and including a first surface 1 and a second surface 2 opposing each other in the first direction, a third surface 3 and a fourth surface 4 connected to the first surface and the second surface and opposing each other in the second direction, and a fifth surface 5 and a sixth surface 6 connected to the first surface to the fourth surface and opposing each other in the third direction, and external electrodes 131 and 132 disposed on the third surface and the fourth surface, and the internal electrode may include first regions 121*a* and 122*a*, a content of Pd included in the first region may be greater than a content of Pd included in the remaining regions 121*b* and 122*b* excluding the first region in the internal electrodes, the first region may be disposed in a region adjacent to an interface between the internal electrodes and the external electrodes, and may not be disposed in a central region of the internal electrodes in the second direction.

As described above, the first regions 121*a* and 122*a* may be formed by, for example, forming a Pd Seed in ends of the internal electrodes, forming a base electrode layer by growing Ni from the Pd Seed using a heat treatment process and an electroplating method, and then, inducing diffusion of the Pd seed through an additional heat treatment process on the base electrode layer.

Accordingly, the first regions 121*a* and 122*a* may be disposed in a region adjacent to an interface between the internal electrodes 121 and 122 and the external electrodes 131 and 132, but may not disposed in a central region of the internal electrodes 121 and 122 in the second direction.

That is, before forming the base electrode layer, the first regions 121*a* and 122*a* disposed in a region adjacent to the interface between the internal electrodes 121 and 122 and the external electrodes 131 and 132 may be formed by forming the Pd seed in the ends of the internal electrodes and performing a heat treatment process, and the plating time may be shortened through the Pd seed, thereby suppressing the penetration of hydrogen ions generated during the plating process into the body.

Meanwhile, when the first regions 121*a* and 122*a* are disposed in a central region of the internal electrodes 121 and 122 in the second direction, since the first region cannot exhibit the effect of preventing penetration of hydrogen ions generated during the plating process, the first regions 121*a* and 122*a* may be disposed in the region adjacent to the interface between the internal electrodes 121 and 122 and the external electrodes 131 and 132, and may not be disposed in the central region of the internal electrodes 121 and 122 in the second direction.

Here, the region adjacent to the interface between the internal electrodes 121 and 122 and the external electrodes 131 and 132 may denote, for example, a region within 6.5 μm in the second direction from the interface between the internal electrodes and the external electrodes, and accordingly, in an example embodiment, the first regions 121*a* and 122*a* may be disposed within 6.5 μm in the second direction from the interface between the internal electrodes and the external electrodes and the first regions 121*a* and 122*a* may not be disposed at a region separated by 6.5 μm or more from the interface between the internal electrodes and the external electrodes in the second direction, but the present disclosure is not limited thereto.

EXPERIMENTAL EXAMPLE

<Electrical Characteristics Evaluation>

A ceramic green sheet coated with an internal electrode paste was stacked, cut and sintered to produce a body, a Pd Seed was formed in an end of an internal electrode exposed to a surface of the body and was then heat-treated at a temperature of 150° C. to 1100° C. for 15 to 360 minutes.

Next, Ni was grown from the Pd seed using an electroplating method to form a base electrode layer, and then, an additional heat treatment was performed on the base electrode layer at a temperature of 150° C. to 1100° C. for 15 minutes to 360 minutes. Meanwhile, an entire plating time was consumed until a coverage of a plurality of internal electrodes of the base electrode layer reached 100%. Then, an intermediate electrode layer including Cu and glass on the base electrode layer, and a Ni plating layer and a Sn plating layer sequentially stacked on the intermediate electrode layer were formed to complete a sample chip of Experimental Example 1, so that Experimental Example 1 included the base electrode layer including Ni and Pd, and the internal electrode including the first region.

Meanwhile, Comparative Example 1 prepared the same body as Experimental Example, and after dipping and sintering the body into a paste including Cu and glass, a Ni plating layer and a Sn plating layer were formed on a sintered electrode. Then, the capacitance and DF values of Experimental Example 1 and Comparative Example 1 were measured.

Figure 10:
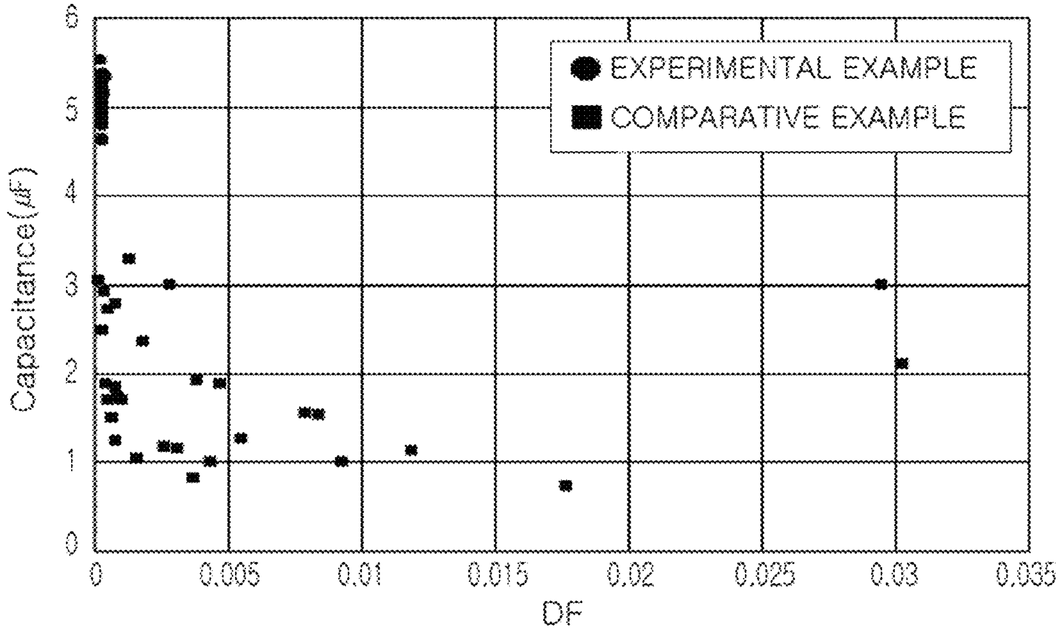
FIG. 10 is a graph illustrating results of measuring capacitance and DF values for Experimental Example and Comparative example.

FIG. 10 is a graph illustrating results of measuring capacitance and DF values for the Experimental Example and the Comparative Example. Referring to FIG. 10, it may be confirmed that Experimental Example 1 has excellent capacitance and a low DF value as compared to Comparative Example 1. Accordingly, it may be confirmed that the electrical characteristics of Experimental Example 1 may be improved as compared to Comparative Example 1.

<Evaluation of Hydrogen Penetration>

Next, Experimental Example 2 and Comparative Example 2 were manufactured to measure the amount of hydrogen penetration in the body. Experimental Example 2 was manufactured in the same manner as Experimental Example 1 described above, and Comparative Example 2 prepared the same body as Experimental Example 1, in which the process of forming the Pd seed was omitted, and Ni was then plated using an electroplating method in the same manner as the Experimental Example to form a base electrode layer, and then, an intermediate electrode layer, a Ni plating layer, and a Sn plating layer were sequentially formed, thus completing a sample chip of Comparative Example 2. Then, the amount of hydrogen in the bodies of Experimental Example 2 and Comparative Example 2 was measured by the ISO 17081 standard test method, and shown in Table 1 below.

TABLE 1

| Division | Plating Time | Amount of Hydrogen in the Body after Plating (wt · ppm) |
|---|---|---|
| Experimental Example 2 | 1 hr | 6.9 |
| Comparative Example 2 | 5 hr | 13 |

Referring to Table 1 above, it may be confirmed that for Experimental Example 2, by forming the base electrode layer on the Pd seed, the base electrode layer including Ni and Pd, and internal electrodes including the first region are included to suppress the penetration of hydrogen into the body, and accordingly, the amount of hydrogen in the body after plating is relatively lower than that of Comparative Example 2. However, it may be confirmed that for Comparative Example 2, by omitting the process of forming the Pd seed, the base electrode layer does not include Pd and the internal electrodes do not include the first region, and accordingly, the amount of hydrogen in the body after plating is relatively higher than that of Experimental Example 2. Accordingly, for Experimental Example 2, the base electrode layer is formed using the Pd seed and the Ni plating to effectively reduce the plating time, and the internal electrodes including the first region are formed to suppress the penetration amount of hydrogen.

The present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an example embodiment' used in the present disclosure does not denote the same example embodiment, and is provided to emphasize and explain different unique characteristics. However, the example embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

In addition, expressions such as first and second are used to distinguish one component from another, and do not limit the order and/or importance of the components. In some cases, a first component may be referred to as a second component without departing from the scope of rights, or similarly, the second component may be referred to as the first component.

What is claimed is:

1. A multilayer electronic component comprising:

a body including a dielectric layer and internal electrodes alternately disposed with the dielectric layer in a first direction, the internal electrodes including Ni; and an external electrode disposed on the body and connected to the internal electrodes, wherein the external electrode includes a base electrode layer including Ni and Pd, the base electrode layer being connected to the internal electrodes, and the external electrode further includes an intermediate electrode layer disposed on the base electrode layer and including Cu and glass, and at least one of the internal electrodes includes a first region, and a content of Pd included in the first region is greater than a content of Pd included in a remaining region, excluding the first region in the internal electrodes.

2. The multilayer electronic component according to claim 1, wherein the content of Pd included in the first region is 0.5 at % or more.

3. The multilayer electronic component according to claim 2, wherein the content of Pd included in the first region is 3.0 at % or less.

4. The multilayer electronic component according to claim 1, wherein the first region includes a greater content of Ni than the content of Pd included in the first region.

5. The multilayer electronic component according to claim 1, wherein at least one of the internal electrodes include a plurality of first regions.

6. The multilayer electronic component according to claim 1, wherein the body includes a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction, and the external electrode is disposed on the third surface and the fourth surface.

7. The multilayer electronic component according to claim 6, wherein the first region is disposed within 6.5 μm in the second direction from an interface between the internal electrode and the external electrode.

8. The multilayer electronic component according to claim 1, wherein the base electrode layer includes a second region, and a content of Pd included in the second region is greater than a content of Pd included in a remaining region, excluding the second region in the base electrode layer.

9. The multilayer electronic component according to claim 8, wherein the base electrode layer includes a plurality of second regions.

10. The multilayer electronic component according to claim 1, wherein the internal electrodes and the base electrode layer includes Ni as a main component.

11. The multilayer electronic component according to claim 1, wherein the base electrode layer includes a first layer disposed to be in contact with the body and a second layer disposed on the first layer, and a content of Pd included in the first layer is greater than a content of Pd included in the second layer.

12. The multilayer electronic component according to claim 1, wherein the base electrode layer is disposed between a plane along which the first surface is disposed and a plane along which the second surface is disposed.

13. The multilayer electronic component according to claim 1, wherein the intermediate electrode layer is disposed to extend to at least a portion of the first surface and the second surface.

14. The multilayer electronic component according to claim 1, wherein the external electrode further includes a plating layer disposed on the intermediate electrode layer.

15. A multilayer electronic component comprising:

a body including a dielectric layer and internal electrodes alternately arranged with the dielectric layer in a first direction, the body including a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction; and an external electrode disposed on the third surface and the fourth surface, wherein the external electrode includes a base electrode layer connected to the internal electrodes and including Ni and Pd, and an intermediate electrode layer disposed on the base electrode layer and including Cu and glass, wherein the internal electrodes include a first region away from a center of the internal electrodes in the second direction, and wherein a content of Pd included in the first region is greater than a content of Pd included in a remaining region, excluding the first region in the internal electrodes.

16. The multilayer electronic component according to claim 15, wherein the first region is disposed within 6.5 μm in the second direction from the interface between the internal electrodes and the external electrode.

17. The multilayer electronic component according to claim 15, wherein the content of Pd included in the first region is 0.5 at % or more.

18. The multilayer electronic component according to claim 17, wherein the content of Pd included in the first region is 3.0 at % or less.

19. A multilayer electronic component comprising:

a body including a dielectric layer and internal electrodes alternately disposed with the dielectric layer in a first direction, the internal electrodes including Ni; and an external electrode disposed on the body and connected to the internal electrodes, wherein the external electrode comprises a base electrode layer including a first layer contacting the body and a second layer disposed on the first layer, the first layer having more Pd content relative to a remainder of the base electrode layer, and wherein the external electrode further includes an intermediate electrode layer disposed on the base electrode layer and including Cu and glass.

20. The multilayer electronic component according to claim 19, wherein the intermediate electrode layer disposed on the base electrode layer, the intermediate electrode layer disposed to extend to at least a portion of a surface of the body on which the base electrode layer is disposed.

21. The multilayer electronic component according to claim 19, wherein at least one of the internal electrodes comprise a first region having Pd content greater than a remainder of the at least one internal electrode.

22. The multilayer electronic component according to claim 21, wherein the first region is disposed relatively closer to an interface between the at least one internal electrode and the external electrode.

23. The multilayer electronic component according to claim 22, wherein content of Pd in the first region is in a range from 0.5 at % to 3.0 at %.

* * * * *